United States Patent [19]

Ruckes et al.

[11] Patent Number: 5,262,448
[45] Date of Patent: Nov. 16, 1993

[54] PROCESS FOR THE PREPARATION OF POLYUREA ELASTOMERS CONTAINING URETHANE GROUPS

[75] Inventors: Andreas Ruckes; Hans-Joachim Meiners; Heinrich Boden, all of Leverkusen; Manfred Schmidt, Dormagen, all of Fed. Rep. of Germany

[73] Assignee: Bayer Aktiengesellschaft, Leverkusen, Fed. Rep. of Germany

[21] Appl. No.: 515,885

[22] Filed: Apr. 27, 1990

[30] Foreign Application Priority Data

May 4, 1989 [DE] Fed. Rep. of Germany ....... 3914718

[51] Int. Cl.⁵ .............................................. C08G 18/10
[52] U.S. Cl. .................................... 521/159; 521/51;
521/117; 521/129; 521/160; 521/163; 528/53;
528/61; 528/63; 528/64; 528/76; 528/83;
264/51; 264/328.1; 264/328.6
[58] Field of Search ................ 521/160, 51, 117, 129,
521/159, 163; 528/53, 61, 63, 64, 76, 83;
264/51, 328.1, 328.6

[56] References Cited

U.S. PATENT DOCUMENTS

| | | | |
|---|---|---|---|
| 3,428,610 | 2/1969 | Klebert | 528/64 |
| 4,218,543 | 8/1980 | Weber et al. | 521/51 |
| 4,297,444 | 10/1981 | Gilbert et al. | 521/160 |
| 4,374,210 | 2/1983 | Ewen et al. | 521/159 |
| 4,433,067 | 2/1984 | Rice et al. | 521/51 |
| 4,444,910 | 4/1984 | Rice et al. | 521/51 |
| 4,499,254 | 2/1985 | Dominguez et al. | 528/49 |
| 4,689,356 | 8/1987 | Peffley et al. | 521/159 |
| 4,892,920 | 1/1990 | Quay et al. | 528/76 |

Primary Examiner—John Kight, III
Assistant Examiner—John M. Cooney, Jr.
Attorney, Agent, or Firm—Joseph C. Gil; Thomas W. Roy; N. Denise Brown

[57] ABSTRACT

The present invention relates to a process for the production of an optionally cellular elastomeric molded article having a compact surface and based on a polyurea elastomer containing urethane groups which is the reaction product of a) a polyisocyanate component based on a polyisocyanate of the diphenylmethane series, b) a polyol component based on a polyether polyol, a polyester polyol or mixtures thereof and c) a polyamine component containing
1) 50 to 95% by weight, based on the weight of component c), of at least one sterically hindered aromatic diamine and
2) 5 to 50% by weight, based on the weight of component c), of at least one compound which has a molecular weight of about 1,000 to 12,000, by reacting component a) with at least 90% by weight of component b) at an NCO/OH equivalent ratio of at least 4:1 to form an NCO semi-prepolymer and subsequently reacting the NCO semi-prepolymer with component c) and the remainder of component b) by the reaction injection molding process to form the polyurea elastomer containing urethane groups, component c) being present in an amount sufficient to provide an isocyanate index, based on the reactive groups of components a), b) and c), of 70 to 130.

8 Claims, No Drawings

PROCESS FOR THE PREPARATION OF POLYUREA ELASTOMERS CONTAINING URETHANE GROUPS

BACKGROUND OF THE INVENTION

1. Field of the Invention

The present invention relates to a new process for the preparation of polyurea elastomers containing urethane groups from polyisocyanates of the diphenylmethane series, high molecular weight polyhydroxy compounds, alkyl-substituted aromatic diamines and high molecular weight polyamino compounds in accordance with reaction injection molding process.

2. Description of the Prior Art

The preparation of polyurea elastomers containing urethane groups in accordance with the reaction injection molding (RIM) process using polyisocyanates or polyisocyanate mixtures of the diphenylmethane series, high molecular weight polyether polyols and alkyl-substituted aromatic diamines is known and disclosed DE-AS 2 622 951 (U.S. Pat. No. 4 218 543). The elastomers are prepared in accordance with the one-shot process, i.e., the polyisocyanate component is reacted with a mixture of the compounds having isocyanate-reactive groups. The process also uses catalysts for the reaction between isocyanate groups and hydroxyl groups.

U.S. Pat. No. 4 374 210 relates to a modification of this process wherein 0.01 to 0.5 equivalent of the high molecular weight polyol component is initially reacted with the polyisocyanate component so that reaction streams of approximately equal volume can be reacted with each other during subsequent processing. In fact, the authors of U.S. Pat. No. 4 374 210 believed to have recognized a disadvantage of the process according to DE-AS 2 622 951, i.e., that significantly uneven flow volumes (low volume of the polyisocyanate component and high volume of the isocyanate-reactive component) are mixed and reacted with each other according to this process.

Surprisingly, it has now been found that an essentially complete preliminary reaction of the high molecular weight polyol component with the polyisocyanate component and subsequent reaction of the resulting NCO semi-prepolymer with the amine component leads to a number of remarkable advantages, although extremely different volume flows have to be reacted with one another in this process (high volume of the NCO semi-prepolymer and low volume of the amine component).

The reaction of pure or polymeric 4,4'-diisocyanatodiphenylmethanes having NCO contents of 30-33.6 wt. % with alkyl-substituted aromatic diamines and polyol mixtures is not possible, since the reactivity of these isocyanates is too high. Liquid semi-prepolymers having NCO contents which vary between 18 and 27 wt. % are therefore initially prepared by a preliminary reaction with aliphatic polyhydroxy compounds having a molecular weight of 62 to 700, such as ethylene glycol or tripropylene glycol. These semi-prepolymers are then reacted to form elastomeric moldings by the RIM process, as described, e.g., in DE-AS 2 622 951. The disadvantage of this process is that the urethane groups formed in the preliminary reaction have low thermal stability and therefore the maximum heat distortion temperature, based on the number of reacting NCO groups, cannot be achieved. A further disadvantage of this process is the use of "high-quality" compounds, i.e., expensive isocyanates, for producing the semi-prepolymers, which do not result in the optimum elastomer properties.

The process according to the invention described in more detail below has, in particular, the following advantages:

1. The greatest proportion of the isocyanate groups is used for building up urea hard segments, and only a minimum of urethane groups is required. This results in a significant savings in the expensive isocyanate in comparison with the one-shot RIM process.

2. For the same amounts of diamines and polyisocyanates, a significant improvement is obtained in the mechanical and thermomechanical properties, in particular the heat distortion temperature, and also low temperature properties.

The torsion curve shows a sharp drop in the low temperature range ($-40°$ to $0°$ C.) and a flatter course in the range above $100°$ C. in comparison with the curves of elastomers prepared by the one-shot process.

3. The use of catalysts which have a marked adverse influence on the heat distortion temperature and the resistance to aging can be dispensed with completely, since the OH groups of the polyhydroxy compounds, which react slowly in comparison with the reactive amino groups, have already reacted in the preliminary reaction.

U.S. Pat. No. 4 297 444 describes the production of polyurethane shaped articles in accordance with reaction injection molding process using organic polyisocyanates, high molecular weight polyhydroxy compounds and low molecular weight chain lengthening agents. In accordance with a preferred embodiment of this process the total amount of the high molecular weight polyhydroxyl component is initially reacted with the polyisocyanate component to produce an NCO semi-prepolymer. However, this prior publication gives no indication that systems of the type to be employed according to the present invention, i.e., those in which the diamine component is based on alkyl-substituted aromatic amines, would also be processable in accordance with this principle, nor does this prior publication recognize the previously described advantages of this process. Although the prior publication also discloses aromatic diamines as suitable chain lengthening agents, it does indicate that aromatic diamines are preferred. Rather, preferred chain lengthening agents are identified as low molecular weight diols such as ethylene glycol or 1,4-butanediol. Ethylene glycol is exclusively used in the examples. Therefore, the processability of reactive systems based on a large flow volume of NCO semi-prepolymer and a small flow volume of highly reactive polyamines by the reaction injection molding process in accordance with the present invention could not be predicted based on the disclosure of U.S. Pat. No. 4 297 444.

The process according to the invention also could not be predicted from the teachings of DE-AS 1 240 654. In this process, as can be seen from the examples, monomer-free, i.e., true, NCO prepolymers based on polyisocyanates and difunctional polyhydroxy compounds are preferably reacted, more preferably in the presence of solvents, with alkyl-substituted diamines in accordance with the classical prepolymer process and not in accordance with the reaction injection molding process.

SUMMARY OF THE INVENTION

The present invention relates to a process for the production of an optionally cellular elastomeric molded article having a compact surface and based on a polyurea elastomer containing urethane groups which is the reaction product of
a) a polyisocyanate component based on a polyisocyanate of the diphenylmethane series,
b) a polyol component having an average molecular weight of about 1,500 to 18,000 and an average hydroxyl functionality of at least 2.5 and which is based on a polyether polyol, a polyester polyol or mixtures thereof and
c) a polyamine component containing
 1) 50 to 95% by weight, based on the weight of component c), of at least one aromatic diamine having a molecular weight of 122 to 400 and having an alkyl substituent in at least one ortho-position to each amino group and
 2) 5 to 50% by weight, based on the weight of component c), of at least one compound which has a molecular weight of about 1,000 to 12,000 and contains at least two isocyanate-reactive groups, provided that at least 80%, based on the isocyanate-reactive groups of component c), are primary and/or secondary amino groups, by reacting component a) with at least 90% by weight of component b) at an NCO/OH equivalent ratio of at least 4:1 to form an NCO semi-prepolymer and subsequently reacting the NCO semi-prepolymer with component c) and the remainder of component b) by the reaction injection molding process to form the polyurea elastomer containing urethane groups, component c) being present in an amount sufficient to provide an isocyanate index, based on the reactive groups of components a), b) and c), of 70 to 130.

DETAILED DESCRIPTION OF THE INVENTION

The term "polyisocyanates of the diphenylmethane series" means the individual polyisocyanates which are present in the phosgenation products of aniline/formaldehyde condensates and which have been separated therefrom and also mixtures of polyisocyanates of the diphenylmethane series, e.g., the phosgenation products of aniline/formaldehyde condensates, mixtures obtained as the distillate or distillation residue during isomer separation of such phosgenation products and any other mixtures of polyisocyanates of the diphenylmethane series.

The term "NCO semi-prepolymer" means products prepared by reacting polyisocyanates of the diphenylmethane series with less than the equivalent amount of the high molecular weight polyhydroxy compounds to be used according to the present invention. The NCO semi-prepolymers are mixtures of prepolymers containing urethane groups with excess unreacted polyisocyanates.

"Isocyanate index" means the number of isocyanate groups multiplied by 100 and divided by the number of isocyanate-reactive groups.

Any polyisocyanates of the diphenylmethane series, optionally in modified form, may be used as starting component a) in the process according to the invention. "In modified form" means a chemical modification to liquefy solid polyisocyanates such as 4,4'-diisocyanatodiphenylmethane.

Examples of suitable polyisocyanates a) include 4,4'-diisocyanatodiphenylmethane, mixtures thereof with 2,4'-and optionally 2,2'-diisocyanatodiphenylmethane, mixtures of these diisocyanatodiphenylmethane isomers with their higher homologs (such as are obtained in the phosgenation of aniline/formaldehyde condensates), di- and/or polyisocyanates modified by partial carbodiimidization of the isocyanate groups of the preceding di- and/or polyisocyanates, and mixtures of any of these polyisocyanates.

Polyisocyanate component a) may also contain up to 30 wt. %, preferably up to 20 wt. %, based on polyisocyanate component a), of reaction products containing urethane groups and prepared by reacting the previously disclosed di-and/or polyisocyanates with less than the equivalent amount of aliphatic polyhydroxy compounds having a molecular weight of 62 to 700, such as ethylene glycol, trimethylolpropane, propylene glycol, dipropylene glycol and polypropylene glycols within this molecular weight range.

Polyol component b) has a average molecular weight, which may be calculated from the hydroxyl group content (OH number) and the hydroxyl functionality, of about 1,500 to 18,000, preferably about 2,000 to 14,00 %a an average hydroxyl functionality of at least 2.5, preferably at least 3 and more preferably at least 3,5. Polyether and/or polyester polyols falling within these molecular weight and functionality ranges are preferred.

Polyether polyols which contain which contain organic fillers in dispersed form may optionally be used. These dispersed fillers include vinyl polymers such as those formed by polymerization of acrylonitrile and styrene in the polyether polyols as the reaction medium (U.S. Pat. No. 3 383 351, 3 304 2739 3 523 093 and 3 110 695 and DE-PS 1 152 536) and polyureas or polyhydrazides such as those formed by a polyaddition reaction between organic diisocyanates and diamines or hydrazine in the polyether polyols as the reaction medium (DE-PS 1,260,142 and DE-OS 2 423 984, 2 519 004, 2 513 815, 2 550 833, 2 550 862, 2 633 293 or 2 550 796).

The polyether polyols are prepared in a known manner by alkoxylating suitable starter molecules or mixtures of suitable starter molecules with propylene oxide and optionally ethylene oxide. Examples of suitable starter molecules include water, ethylene glycol, propylene glycol, trimethylolpropane, pentaerythritol, sorbitol, sucrose and mixtures of these compounds. The previously disclosed functionalities can be obtained by the suitably selecting the functionality of the starter molecules or the average functionality of mixtures of starter molecules. Polyether polyols which contain at least 50%, preferably at least 70%, primary hydroxy groups are particularly preferred. These polyether polyols may be formed by capping polyether polyols with ethylene oxide.

Suitable polyester polyols include those prepared from the starting compounds disclosed in DE-AS 2 622 951, column 7, line 54 to column 8, line 37, (U.S. Pat. No. 4,218,543, herein incorporated by reference) and which fall within the previously disclosed molecular weight and hydroxyl functionality ranges.

Polyether polyols and mixtures of polyether polyols are preferably used as component b) in the process according to the invention.

Component c) is based on a mixture of 95 to 50 parts by weight, per 100 parts by weight of c), of aromatic diamines cl) and 5 to 50 parts by weight, per 100 parts by weight of c), of compounds c2) containing amino groups.

Suitable compounds which may be used as component c1) include diamines having a molecular weight 122 to 400 and having exclusively aromatically bound primary amino groups. The aromatic diamines contain at least one alkyl substituent in an ortho-position relative to the amino groups an alkyl substituent and preferably contain at least one alkyl substituent in an ortho-position to the first amino groups at least one alkyl substituent and two alkyl substituents in the ortho-positions to the second amino groups. The alkyl substituents preferably have 1 to 4, more preferably 1 to 3, carbon atoms. Preferred aromatic diamines are those which contain an ethyl, n-propyl and/or isopropyl substituent in at least one ortho-position to the amino groups and optionally methyl substituents in the other ortho-positions to the amino groups. Examples of these aromatic diamines include 2,4-diaminomesitylene, 1,3,5-triethyl-2,4-diaminobenzene, 1,3,5-triisopropyl-2,4-diaminobenzene, 1-methyl-3,5-diethyl-2, 4-diaminobenzene and mixtures thereof with 1-methyl-3,5-diethyl-2, 6-diaminobenzene, and 3,5,3',5'-tetraisopropyl-4,4'diaminodiphenylmethane. Any desired mixtures of such diamines can likewise be used as component c). Component c) preferably contains 1-methyl-3,5-diethyl-2,4-diaminobenzene or mixtures thereof with 1-methyl-3,5-diethyl-2,6-diaminobenzene (DETDA).

Suitable compounds which may be used as component c2) include polyethers having at least 2, preferably 2 to 4, isocyanate-reactive groups, preferably in terminal positions, and having a molecular weight of about 1,000 to 12,000, preferably about 2,000 to 8,000. The molecular weight can be calculated, for example, from the functionality and the content of isocyanate-reactive groups. At least 80 equivalent percent of the amino groups of component c2) are primary and/or secondary, aromatically or aliphatically, preferably aromatically, bound amino groups.

The "aminopolyethers" which are suitable as component c2) may be prepared in known manner. For example, the aminopolyethers may be prepared by the amination of polyhydroxy polyethers, such as polypropylene glycol ethers, with ammonia in the presence of Raney nickel and hydrogen (BE-PS 634 741). U.S. Pat. No. 3 654 370 describes the preparation of polyoxyalkylenepolyamines by reaction of the corresponding polyol with ammonia and hydrogen in the presence of a nickel, copper or chromium catalyst. DE-PS 1 193 671 describes the preparation of polyethers having amino end groups by the hydrogenation of cyanoethylated polyoxypropylene ethers. Other methods for the preparation of polyoxyalkylene-(polyether)-amines are described in U.S. Pat. No. 3 155 728, U.S. Pat. No. 3 236 895 and FR-PS 1 551 605. FR-PS 1 466 708 describes the preparation of polyethers containing secondary amino end groups.

High molecular weight polyhydroxy-polyethers can be converted into the corresponding anthranilic acid esters, which are suitable according to the invention as component c2), by reaction with isatoic anhydride, as described, for example, in DE-OS 2 019 432, DE-OS 2 619 840, U.S. Pat. No. 3 808 250, U.S. Pat. No. 3 975 and U.S. Pat. No. 4 016 143. Polyethers having terminal aromatic amino groups are formed in this manner.

According to DE-OS 2 546 536 and U.S. Pat. No. 3 865 791, high molecular weight compounds containing terminal amino groups are obtained by the reaction of NCO prepolymers based on polyhydroxy polyethers with enamines, aldimines or ketimines containing hydroxyl groups and followed by hydrolysis.

Aminopolyethers which are obtained in accordance with DE-OS 2 948 419, EP-A-0 219 035 and U.S. Pat. No. 4,774,263 (herein incorporated by reference) by the hydrolysis of compounds containing terminal isocyanate groups are preferably employed as component c2). In these processes, polyethers or polyesters containing two or three hydroxyl groups are preferably reacted with polyisocyanates to form NCO prepolymers, and the isocyanate groups are then converted into amino groups by hydrolysis in a second step.

The "aminopolyethers" to be employed according to the invention as component c2) also include mixtures of the previously described aminopolyethers.

The auxiliaries and additives d) which may optionally be used include mineral fillers, dyes, pigments and/or organic blowing agents. Suitable auxiliaries and additives, which are known per se, are described, for example, in EP-B-81 701 (U.S. Pat. No. 4,774,263, herein incorporated by reference). Internal mold release agents are also suitable auxiliaries and additives. Suitable internal mold release agents are also described in EP-B-81 701 (U.S. Pat. No. 4,774,263, herein incorporated by reference). Preferred internal mold release agents include solutions of zinc carboxylates, preferably zinc stearate, in aminic solvents such as short-chain aminopolyethers having primary aliphatically bound amino groups (for example, Jeffamine D400, available from Texaco), propoxylated ethylene diamine (for example, the addition product of 5 moles of propylene oxide with 1 mole of ethylenediamine) and mixtures of such aminic solvents. Suitable internal mold release agents are described, for example, in EP-A-0 119 471, U.S. Pat. No. 4 585 803 and U.S. Pat. No. 4 519 965 (both of the U.S. Patents hereby incorporated by reference).

In accordance with the process of the present invention, component b) is used in an amount sufficient to provide an NCO/OH equivalent ratio, based on the reactive groups of components a) and b), of at least 4:1, preferably at least 6:1 and in particular up to 15:1. Component c) is used in an amount sufficient to provide an isocyanate index, based on the reactive groups of components a), b) and c), of 70 to 130.

For carrying out the process according to the invention, an NCO semi-prepolymer is initially prepared from polyisocyanate component a) and at least 90%, preferably the total amount, of polyol component b). This reaction may be carried out at a temperature range of about 25° to 100° C. Several variants may be used in the preparation of the NCO semi-prepolymers. For example, the total amount of polyisocyanate component a) can be reacted with the total amount of component b), or a portion of polyisocyanate component a) can be reacted with component b) and then the remainder of polyisocyanate component a) can be mixed with this reaction product. These NCO semi-prepolymers are used as component A) for the further reaction.

In the second stage of the process according to the invention, component A) is processed with component B) in accordance with the reaction injection molding process using closed molds. Component B) is based on amine component c) and optionally up to 10% of polyol component b), which has not been used for the preparation of the NCO semi-prepolymers. The optional auxiliaries and additives may be incorporated either into component A) or into component B) before carrying out the second stage of the process.

The second stage of the process is carried out in accordance with the reaction injection molding (RIM) process, as described, for example, in the references previously incorporated by reference. The amount of reaction mixture introduced into the mold so that the moldings have a density of about 0.8 to 1.4, preferably about 1.0 to 1.3 g/cm$^3$. Elastomer moldings having a density of about 0.8 to 1.0 g/cm$^3$ are considered to be microcellular elastomers, i.e., not true foams having a foam structure visible to the naked eye. If a blowing agent is used it functions more like a flow agent than a blowing agent. Shaped articles with a density above 1.2 g/cm$^3$ result in particular if mineral fillers are also used.

Components A) and B) generally having a temperature of about 20° to 80° C., preferably 40° to 70° C. when they are introduced into the mold. The molds are known and preferably made of aluminium or steel. The internal walls of the mold may optionally be coated with known external mold release agents in order to improve the mold release properties.

The elastomers formed in the mold may generally be released from the mold after a mold dwell time of about 5 to 180 seconds. If appropriate, the release from the mold is followed by conditioning at a temperature of about 60° to 180° C. for a period of about 30 to 120 minutes.

The elastomers obtained in accordance with the process of the present invention are particularly suitable for the production of flexible car bumpers and flexible vehicle body elements.

In the following examples all parts are by weight unless otherwise indicated.

EXAMPLES

The formulations described in the following examples were reacted in accordance with reaction injection molding process.

The polyisocyanate components and the chain lengthening agents were fed to a high pressure metering unit, and after intensive mixing in a positively controlled mixing head were rapidly injected into a hot metal mold which was temperature-controlled. The inner wall of the mold was coated with a ready-to-use commercially available, external, wax-based mold release agent, i.e., RTCW 2006 from Chemtrend.

The steel sheet mold was used to produce test sheets having dimensions of 300×200×3 mm. The mold was filled from the longitudinal side via a restrictor bar gate. The mold temperature was 80° C. and the mold dwell time was 30 seconds. Under these conditions, molded elastomers having excellent mold release properties and appearance resulted. The mechanical properties of the test sheets were then determined after conditioning for 30 minutes at 120° C.

The following starting components were used in the examples:

| | |
|---|---|
| Polyether polyol 1 PE 1 | OH number 35, prepared by the addition of 87 wt. % propylene oxide and subsequent addition of 13 wt. % ethylene oxide onto trimethylolpropane. |
| Polyether polyol 2 PE 2 | OH number 28, prepared by the addition of 87 wt. % propylene oxide and subsequent addition of 13 wt. % ethylene oxide onto sorbitol. |
| Polyether polyol 3 | OH number 35, prepared by the addition of 87 wt. % propylene oxide and subsequent addition of 13 wt. % ethylene oxide onto glycerol. |
| Polyether polyol 4 PE 4 | OH number 56, prepared by the addition of propylene oxide onto a mixture of trimethylolpropane and water in a weight ratio of 1:1. |
| Polyether polyol 5 PE 5 | OH number 56, prepared by the addition of propylene oxide onto tripropylene glycol. |
| Semiprepolymer 1 SP 1 | prepared by reacting 100 pts. by wt. of polyether polyol 1 with 60.2 pts. by wt. of 4,4'-diisocyanatodiphenylmethane for 3 hours at 80° C. The NCO content was 10.8 wt. %. |
| Semiprepolymer 2 SP 2 | prepared by reacting 100 pts. by wt. of a 1:1 mixture of polyether polyols 1 and 2 (mixed OH number 31.5) with 59.8 pts. by wt. of a 9:1 mixture of 4,4'-diisocyanatodiphenylmethane and Desmodur CD (carbodiimidized 4,4'-diisocyanatodiphenylmethane, available from Bayer AG) for 3 hours at 80° C. The NCO content was 11 wt. %. |
| Chain lengthening agent: CL | a mixture of 65 wt. % 1-methyl-3,5-diethyl-2,4-diaminobenzene and 35 wt. % 1-methyl-3,5-diethyl-2,6-diaminobenzene. |
| Polyether polyamine 1 ATP 1 | NH number 44.8, prepared by the hydrolysis of an NCO prepolymer having an NCO content of 3.2 wt. % and obtained by the reaction of a 2:1 mixture of polyether polyols 3 and 4 with 2,4-diisocyanatotoluene at an NCO:OH equivalent ratio of 2:1. |
| Polyether polyamine 2 ATP 2 | NH number 48, prepared by the hydrolysis of an NCO prepolymer having an NCO content of 3.6 wt. % and obtained by the reaction of polyether polyol 5 with 2,4-diisocyanatotoluene at an NCO:OH equivalent ratio of 2:1. |
| Polyether polyamine 3 ATP 3 | NH number 33.6, a polyether polyamine available from Texaco as Jeffamine T 5000. |
| Polyether polyamine 4 ATP 4 | NH number 280, a polyether polyamine available from Texaco as Jeffamine D 400. |
| Examples 1 to 5: | see Table 1. |

TABLE 1

| Formulation: Example | 1 | 2 | 3 | 4 | 5* |
|---|---|---|---|---|---|
| Mixing ratio: (CL/ATP) | 10:1 | 5:1 | 1:1 | 10:1 | 10:1 |
| CL (pts. by wt.) | 22.7 | 22.5 | 21.3 | 22.7 | 22.7 |
| ATP 1 (pts. by wt.) | 2.27 | 4.5 | 21.3 | | |
| ATP 2 (pts. by wt.) | | | | 2.27 | |
| ATP 3 (pts. by wt.) | | | | | 2.27 |
| SP 1 (pts. by wt.) | 100 | 100 | 100 | 100 | 100 |
| Mixing ratio: (SP:CL/ATP) | 4:1 | 3.7:1 | 2.35:1 | 4:1 | 4:1 |
| Isocyanate index | 100 | 100 | 100 | 100 | 100 |
| Density (kg/m$^3$) (DIN 53420) | 1.1 | 1.11 | 1.1 | 1.11 | 1.11 |
| Shore D (DIN | 61 | 60 | 54 | 60 | 61 |

TABLE 1-continued

| Formulation: Example | 1 | 2 | 3 | 4 | 5 |
|---|---|---|---|---|---|
| 53505) | | | | | |
| Flexural modulus (MPa) (ASTM-D 790-71) | 350 | 330 | 240 | 350 | 340 |
| Tensile strength (MPa) (DIN 53504) | 32 | 30 | 25 | 31 | 30 |
| Elongation at break (%) (DIN 53504) | 210 | 230 | 320 | 260 | 260 |
| SAG test (mm) 1 h/160° C. 100 mm test specimen thickness | 5 | 6 | 8 | 8 | 5 |

EXAMPLE 6

In this example the procedure was the same as in Examples 1 to 5 with the exception that 32.7 pts. by wt. of glass fibers were additionally added as a filler to the isocyanate component before the reaction (ratio of the flow volume about 4.3:1) and that Zn stearate dissolved in ATP 4 (1:1) was added to the amine component as an internal mold release agent.

| Formulation: | |
|---|---|
| CL (pts. by wt.) | 21.7 |
| ATP 1 (pts. by wt.) | 6.2 |
| ATP 4 (pts. by wt.) | 1.55 |
| Zn stearate (pts. by wt.) | 1.55 |
| SP 2 (pts. by wt.) | 100 |
| Isocyanate index: | 100 |
| Properties | |
| Density (kg/m³) (DIN 53420) | 1.24 |
| Shore D (DIN 53505) | 65 |
| Flexural modulus (MPa) (ASTM-D 790-71) | 1180 |
| Tensile strength (MPa) (DIN 53504) | 27 |
| Elongation at break (DIN 53504) | 170 |
| SAG test (mm) 1 h/160° C. 100 mm test specimen thickness | 4 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of an optionally cellular elastomeric molded article having a compact surface and based on a polyurea elastomer containing urethane groups comprising reacting by the reaction injection molding process a reaction mixture comprising a) a polyisocyanate component comprising a polyisocyanate of the diphenylmethane series, b) a polyol component having an average molecular weight of about 1,500 to 18,000 and comprising a member selected from the group consisting of polyether polyols, polyester polyols, and mixtures thereof, and c) a polyamine component comprising c1) 50 to 95% by weight, based on the weight of component c), of at least one aromatic diamine having a molecular weight of 122 to 400 and having an alkyl substituent in at least one ortho-position to each amine group, and c2) 5 to 50% by weight, based on the weight of component c), of at least one polyether polyamine which has a molecular weight of about 1000 to 12,000 and contains at least two isocyanate-reactive groups, provided that at least 80%, based on the isocyanate-reactive groups of component c), are primary and/or secondary amine groups, the improvement wherein
   i) an isocyanate semi-prepolymer is formed by the reaction of component a) with at least 90% of the total quantity of component b), at an NCO/OH equivalent ratio of at least 4:1,
   ii) said semi-prepolymer is subsequently reacted by the reaction injection molding process with component c) and any remaining amount of component b) to form said polyurea elastomer containing urethane groups, and
   iii) component c) is present in the reaction injection molding process in a quantity such that the isocyanate index, based on the reactive groups of components a), b), and c), is from 70 to 130.

2. The process of claim 1 which comprises reacting all of component b) with component a) to form said NCO semi-prepolymer.

3. The process of claim 1 wherein component b) comprises at least one polyether polyol having an average molecular weight of about 2,000 to 14,000 and an average hydroxyl functionality of $\geq 3$.

4. The process of claim 2 wherein component b) comprises at least one polyether polyol having an average molecular weight of about 2,000 to 14,000 and an average hydroxyl functionality of $\geq 3$.

5. The process of claim 1 herein component c1) comprises 1-methyl-3,5-diethyl-2,4-diaminobenzene or mixtures thereof mixtures with 1-methyl-3,5-diethyl-2,6-diaminobenzene.

6. The process of claim 2 wherein component c1) comprises 1-methyl-3,5-diethyl-2,4-diaminobenzene or mixtures thereof mixtures with 1-methyl-3,5-diethyl-2,6-diaminobenzene.

7. The process of claim 3 wherein component c1) comprises 1-methyl-3,5-diethyl-2,4-diaminobenzene or mixtures thereof mixtures with 1-methyl-3,5-diethyl-2,6-diaminobenzene.

8. The process of claim 4 wherein component c1) comprises 1-methyl-3,5-diethyl-2,4-diaminobenzene or mixtures thereof mixtures with 1-methyl-3,5-diethyl-2,6-diaminobenzene.

* * * * *